UNITED STATES PATENT OFFICE.

OSWALD HAMILTON, OF NORTHFLEET, ENGLAND.

PRODUCTION OF BASIC CARBONATE OF LEAD.

SPECIFICATION forming part of Letters Patent No. 576,670, dated February 9, 1897.

Application filed April 30, 1896. Serial No. 589,750. (No specimens.)

*To all whom it may concern:*

Be it known that I, OSWALD HAMILTON, a subject of the Queen of Great Britain and Ireland, and a resident of the Undershore, Northfleet, in the county of Kent, England, have invented certain new and useful Improvements in the Production of Basic Carbonate of Lead, of which the following is a specification.

My invention relates to improvements in the production of basic carbonate of lead; and the object of this invention is to obtain basic carbonate of lead, known as "white lead," of a more regular composition and in a more economic manner than heretofore produced, while securing at the same time all the characteristics of the white lead produced by the Stack process without many of the disadvantages of the latter.

The improved process mainly consists in treating oxid of lead with a dilute solution of acetate of lead and acetate of ammonium, employed in proportion of the chemical equivalents indicated in the following formula:

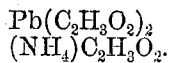

$$Pb(C_2H_3O_2)_2$$
$$(NH_4)C_2H_3O_2.$$

As carried out on the large scale I usually employ about nine thousand gallons of a five-per-cent. solution, and this is capable of dissolving about thirty-five hundredweights to two tons of oxid of lead. I find, moreover, that larger quantities can be dissolved on the large scale than on the laboratory scale. Whatever quantity of materials are employed it is important that the solubility should be taken into account. To this solution is added litharge which has been powdered in such a manner so as to insure that all the litharge (preferably made by oxidation of refined lead on bone-ash tests, as in cupellation of silver) has been converted into the red variety, which I find more soluble and of somewhat different physical properties than litharge which has not undergone this treatment. Great care must be exercised in the addition of the litharge, and the rate of addition should be such that the litharge goes into solution as it is added; otherwise the litharge will form clots surrounded with a coating of basic acetate of lead, which prevents the further action of the liquor or solution upon the inner core of litharge.

The solution is heated to a temperature of 80° centigrade, but the addition of litharge may commence at a much lower temperature, provided the above precaution is taken. Moreover, the small quantity of ammonia given off during solution will not be intimately mixed with the acetate solution. Even where a partly-open vessel is employed, if the above-named temperature is not exceeded, the loss of ammonia is exceedingly small and does not seriously affect the carbonation process or the use of the liquor over again, only greater care is requisite.

During the first stage of solution the litharge freely dissolves, but toward the end the litharge must be added cautiously, as described.

When solution is complete, the solution will have an alkaline reaction and will smell of ammonia, being about 14° to 16° Twaddell. The solution is then filtered, if necessary, in any well-known manner and the clear solution pumped into carbonating vessels, where it is treated with carbonic-acid gas. The vessel should be of a suitable size, and the strength of the carbonic-acid gas should be such that the gas shall mix thoroughly and carbonate equally the whole mass of the solution. When the carbonation is properly carried out, the basic carbonate of lead will be of the right consistency and density, while the mother liquor will be of a specific gravity of about 4° to 5° Twaddell and will be approximately the same composition as the solution first employed and should possess a faint alkaline reaction. The solution containing the basic carbonate in suspension is then passed into filter-presses, the clear solution passing to the digesting vessel, already described, for use over again. The white lead remaining in the presses is washed first with a dilute solution of sodium carbonate to precipitate the lead solution remaining in the cakes of white lead, and then the lead is washed with water till the wash-waters are quite neutral. The first wash-waters are treated for the recovery of the acetic acid. The white lead in the filter-presses is then removed and placed in pots or dishes, which, when packed on suitable trucks or trolleys, are run into a chamber heated by hot air at a temperature of 100° centigrade.

When dry, the pots are emptied and the white lead is placed under edge-runners, which in a few minutes rolls out the air intimately associated with the lead, reducing it to a compact and dense form for the market.

In my process the reactions which take place are as follows:

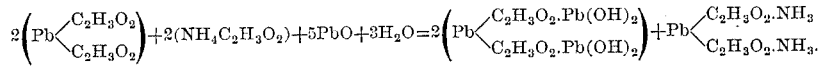

Having fully described my invention, what I desire to claim and secure by Letters Patent is—

The process for the production of that basic carbonate of lead known as "white lead" which consists in dissolving litharge or oxid of lead in a solution of lead and ammonium acetates in equivalent molecular proportions to form a mixture of tribasic-lead acetate and ammonio-lead acetate, and then subjecting the solution to the action of carbonic-acid gas in order to precipitate basic carbonate of lead as specified and regenerate the liquor for use over again as described.

In testimony that I claim the foregoing as my invention I have signed my name, in presence of two witnesses, this 10th day of April, 1896.

OSWALD HAMILTON.

Witnesses:
 A. I. BECKNORE,
 PERCY E. MATTOCKS.